F. P. DUNN.
WEIGHING SCALE.
APPLICATION FILED JUNE 27, 1910.

1,213,168.

Patented Jan. 23, 1917.

Witnesses
Walter Troemel.
Thomas H. McMeans

Inventor
Frank P. Dunn.
By Bradford Hood.
Attorneys

UNITED STATES PATENT OFFICE.

FRANK P. DUNN, OF ANDERSON, INDIANA, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,213,168.

Specification of Letters Patent.

Patented Jan. 23, 1917.

Application filed June 27, 1910. Serial No. 569,191.

*To all whom it may concern:*

Be it known that I, FRANK P. DUNN, a citizen of the United States, residing at Anderson, in the county of Madison and State of Indiana, have invented a new and useful Weighing-Scale, of which the following is a specification.

An object of my invention is to produce a weighing scale having a load-receiving platform which is raised but very little above the surface upon which the scale structure is supported, thus reducing very materially the amount of labor required in raising successive quantities of commodities to weighing position.

A further object of my invention is to provide a weighing scale having a scale-beam upon which is mounted an automatically shiftable counterpoise arm which itself serves to counterbalance the weight of the commodity-receiving platform, and to connect the scale-beam with an indicating drum upon which may be arranged a multiplicity of sets of graduations indicating aggregate values of differently priced commodities.

The accompanying drawings illustrate my invention.

Figure 1:
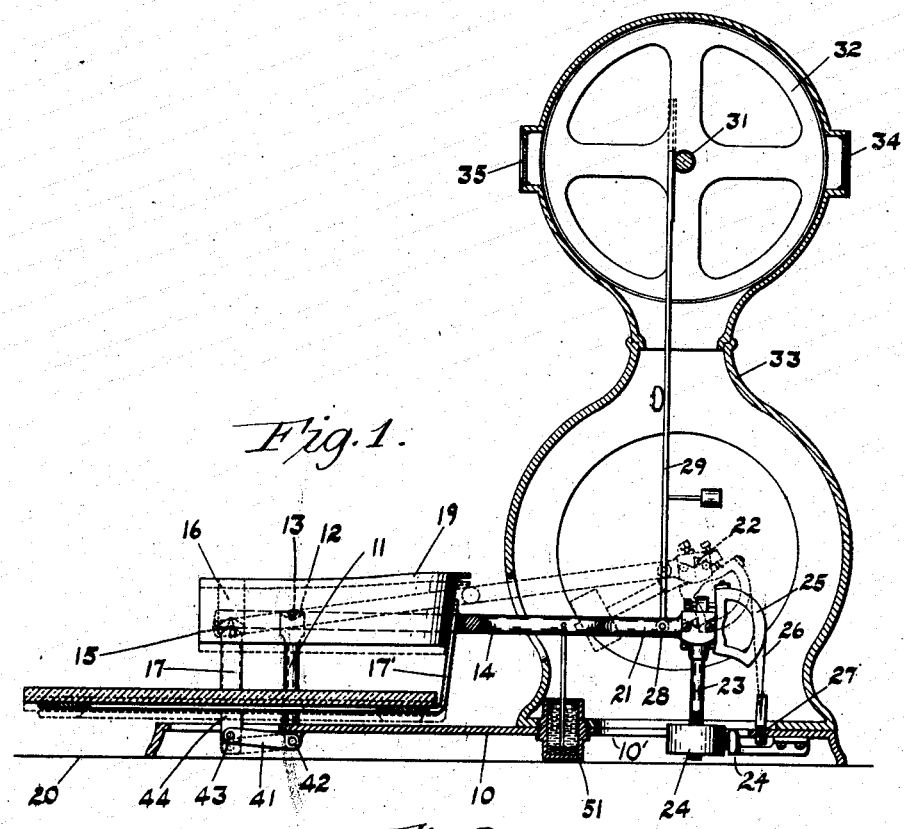
Figure 2:
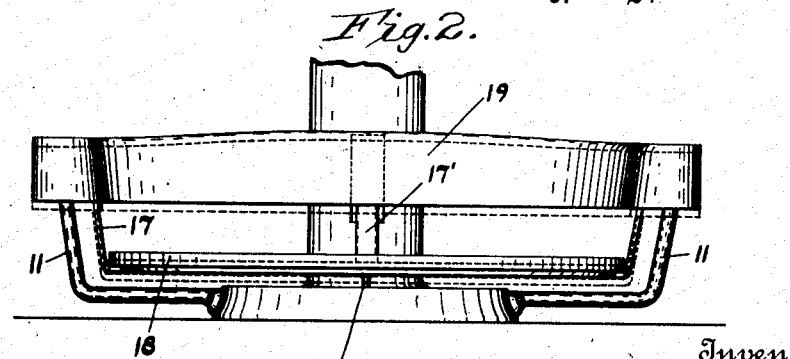

Figure 1 is a vertical section of a scale constructed in accordance with my invention and Fig. 2 a fragmentary elevation of the commodity-receiving platform and supporting base.

In the drawings, 10 indicates a suitable supporting base which should preferably be made very low, especially at that end adjacent the commodity-receiving platform. Extending upwardly from the base 10, upon opposite sides thereof, are two separated brackets 11, 11 each of which, at its upper end, is provided with a crotch bearing 12 adapted to receive the knife edge fulcrum 13 of the balancing beam 14. The beam 14 is bifurcated or yoked at its commodity-receiving end so that each knife edge 13 is carried by one of the arms of the yoke, and beyond the knife edge 13 each arm of the yoke is provided with an upwardly-presented knife edge 15 adapted to receive a crotch block 16 carried at the upper end of an arm 17. The two arms 17 are carried at opposite ends of a commodity-receiving platform 18 and secured to these arms 17, and to one or more intermediate arms 17', is a U-shaped guard 19 which conforms substantially to a semi-circumference of the platform 18 and is formed as a depending apron which protects the several knife edges and their bearings and extends down into the yoke-shaped end of the beam 14 so as to prevent any commodity, placed upon platform 18, from engaging the scale-beam. The arms 17 depend considerably below the crotch block 16 so that the commodity-receiving platform may lie very close indeed to the upper surface of the base 10. The scale-beam 14 must, of necessity, be at a considerable height above the surface 20 upon which the base 10 may rest but, by the arrangement shown, the commodity-receiving platform 18 may be placed within a couple of inches of this surface thus materially lessening the labor of placing commodities upon the receiving platform.

While my improved commodity-receiving platform may be used in connection with the beams of different types of scale, it is especially adapted for use in connection with the particular type of scale-beam which I have shown in the present drawings. The long arm of the scale-beam 14 is bifurcated at 21 so as to form a pair of arms between which is mounted, on suitable knife edges 22, a depending counterpoise arm 23 the lower end of which carries a weight 24 which, in its normal depending position, balances the weight of the platform 18 and associated parts. The counterpoise arm and weight together constitute a counterpoise for the scale, as is evident from an inspection of a drawing. The base 10 is provided with an opening or cutaway portion 10' within which the lower end of the pendulum depends and a stop or buffer 24' is secured to the base with its end projecting into the opening to form a stop or limit for the movement of the pendulum. Secured to arm 23 beyond knife edge 22 is a cam 25 which partakes of the swinging movement of the weighted arm 23. Secured to the upper end of cam 25 is one end of a flexible, but non-stretching, tape 26 the lower end of which is adjustably connected to the base 10 by means of an adjusting screw 27.

Pivoted at 28 upon beam 14 is the lower end of a rack bar 29 the upper toothed end of which meshes with a pinion 31 carried by the indicator drum 32 which is suitably journaled on a horizontal axis in the upper part of an inclosing casing 33 carried by or formed integral with base 10. That portion of casing 33 which incloses drum 32 is provided at opposite sides with sight openings 34 and 35 through which the indicating divisions of the drum are visible to the customer and the operator respectively.

Any suitable means may be used for keeping the platform 18 horizontal, either a "high check" or a "low check" being available for this purpose. In the present drawings I have shown a "low check" consisting of a link 41 pivoted at 42 to the base 10 and at 43 to a bracket 44 depending from platform 18. A suitable dash pot 51 is provided to steady the movement of the beam.

I claim as my invention:

1. In a weighing scale, a low base 10, brackets 11, arising from either side of the base, a bifurcated beam 14 the limbs of which are separately fulcrumed upon said brackets, a platform suspended between the limbs of the beam in close proximity to the base and extending past the fulcrum, and an automatically adjustable counterpoise for the load connected to the beam and to the base.

2. In a weighing scale, a low base 10, brackets 11, arising from either side of the base, a bifurcated beam 14, the limbs of which are separately fulcrumed upon said brackets, a platform suspended between the limbs of the beam in close proximity to the base and extending beyond the latter and past the fulcrum, and an automatically adjustable counterpoise for the load connected to the beam and to the base.

3. In a weighing scale, a low base 10, brackets 11 arising from either side of the base, a bifurcated beam 14 the limbs of which are separately fulcrumed upon said brackets, a platform suspended between the limbs of the beam in close proximity to the base, and a guard 19 rigidly connected to the platform and arranged within the limbs of the beam.

4. In a device of the class described, a frame, a scale beam, fulcra upon the frame upon which the scale beam is mounted, a goods receiving platform upon the beam at one side of the fulcra, a pendulum counterpoise wholly suspended from the beam at the other side of the fulcra, a segment secured to the counterpoise on the side thereof remote from the fulcrum for movement therewith, a strap passing over the curved edge of the segment and secured to the frame whereby movement of the beam causes the pendulum to swing in relation thereto and indicating mechanism and connections from the beam thereto, independent of the counterpoise.

5. In a device of the class described, a frame, beam supports mounted thereon, a beam upon the supports, a goods receiver upon the beam, one end of the beam being bifurcated, a pendulum mounted between the limbs of the bifurcation, a segment attached to the pendulum on the side thereof remote from the fulcrum for movement therewith to angularly adjustable relation thereto, a strap passing over the segment and connected to the frame and indicating mechanism and connections from the beam thereto, independent of the counterpoise.

6. In a device of the class described, a base, beam supports carried thereby, a beam bifurcated at both ends mounted upon the beam supports, a goods receiver mounted upon the beam and depending between the limbs of the bifurcation at one end, a pendulum entirely supported by and suspended between the limbs of the bifurcation at the other end of the beam, a segment secured to the pendulum on that side thereof away from the fulcrum for movement therewith, and a strap passing over the segment and secured at one end to the frame.

7. In a weighing scale, a scale-beam having separated alined fulcrum points, a commodity-receiving platform supported by said beam between and below said fulcrum points, a guard carried by said platform and extended adjacent the fulcrum points and beam to prevent material upon the platform from engaging the beam, a normally depending counterpoise arm pivotally mounted upon the scale-beam, a connection between said pivoted arm and a stationary support to cause the counterpoise to swing upwardly and inwardly under application of a load to the platform, and indicating means to indicate various positions of balance of the scale-beam under a load applied to the platform.

8. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam, a normally depending counterpoise arm pivotally mounted upon the scale-beam, a connection between said pivoted arm and a stationary support to cause the counterpoise to swing upwardly and inwardly under application of a load to the platform, and indicating means to indicate various positions of balance of the scale-beam under a load applied to the platform.

9. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam beyond the fulcrum points, a normally depending counterpoise arm pivotally mounted upon the scale-beam, a connection between said pivoted arm and a stationary support to cause the counterpoise to swing upwardly and inwarldy under application of a load to the platform, and indicating means to indicate various positions of balance of the scale-beam under a load applied to the platform.

10. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam, a U-shaped guard carried by the commodity platform above the same inside and independent of the yoke of the beam, a normally depending counterpoise arm pivotally mounted upon the scale-beam, a connection between said pivoted arm and a stationary support to cause the counterpoise to swing upwardly and inwardly under application of a load to the platform, and indicating means to indicate various positions of balance of the scale-beam under a load applied to the platform.

11. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam beyond the fulcrum points, a U-shaped guard carried by the commodity platform above the same inside and independent of the yoke of the beam, a normally depending counterpoise arm pivotally mounted upon the scale-beam, a connection between said pivoted arm and a stationary support to cause the counterpoise to swing upwardly and inwardly under application of a load to the platform, and indicating means to indicate various positions of balance of the scale-beam under a load applied to the platform.

12. In a weighing scale, a scale-beam having separated alined fulcrum points, a commodity-receiving platform supported by said beam between and below said fulcrum points, a normally depending counterpoise arm pivotally mounted upon the scale-beam, an extension carried by said counterpoise arm and projecting beyond the end of the beam, a connection between said extension and a stationary support to cause upward swinging of the counterpoise under load applied to the platform, an indicator drum journaled above the scale-beam, and a connection between the scale-beam and said indicator drum.

13. In a weighing scale, a scale-beam having separated alined fulcrum points, a commodity-receiving platform supported by said beam between and below said fulcrum points, a guard carried by said platform and extending adjacent the fulcrum points and beam to prevent material upon the platform from engaging the beam, a normally depending counterpoise arm pivotally mounted upon the scale-beam, an extension carried by said counterpoise arm and projecting beyond the end of the beam, a connection between said extension and a stationary support to cause upward swinging of the counterpoise arm under load applied to the platform, an indicator drum journaled above the scale-beam, and a connection between the scale-beam and said indicator drum.

14. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam, a normally depending counterpoise arm pivotally mounted upon the scale-beam, an extension carried by said counterpoise arm and projecting beyond the end of the beam, a connection between said extension and a stationary support to cause upward swinging of the counterpoise arm under load applied to the platform, an indicator drum journaled above the scale-beam, and a connection between the scale-beam and said indicator drum.

15. In a weighing scale, the combination of a suitable base, a pair of separated alined fulcrums carried by said base, a scale-beam having a yoke-shaped end the arms of which carry alined fulcrum points adapted to rest in the fulcrums, a commodity-receiving platform arranged between the fulcrums, upwardly extending brackets carried by said commodity platform and hung upon the scale-beam, a U-shaped guard carried by the commodity platform above the same inside and independent of the yoke of the beam, a normally depending counterpoise arm pivotally mounted upon the scale-beam, an extension carried by said counterpoise arm and projecting beyond the end of the beam, a connection between said extension and a stationary support to cause upward swinging of the counterpoise arm under load applied to the platform, an indicator drum journaled above the scale-beam, and a connection between the scale-beam and said indicator drum.

16. In a weighing scale, the combination of a suitable supporting base, a scale-beam pivoted thereon, a load-receiving platform applied to said beam, a swinging counterpoise applied to said beam and wholly carried thereby, a restraining means applied to said counterpoise at a point beyond the pivot of the counterpoise to cause a swinging movement of the counterpoise relative to the scale-beam and toward the pivot thereof by reason of movement of the scale-beam about its pivot, a standard, an indicator drum journaled at the upper end of said standard, a pinion carried by said drum, and a rack bar engaging said pinion at its upper end and connected at its lower end to the scale-beam.

17. In a weighing scale, the combination of a suitable supporting base, a scale-beam pivotally supported upon said base, a load-receiving platform applied to said beam, a counterpoise pivotally supported upon one end of the scale-beam, an extension carried by said counterpoise and extended beyond the end of the beam, and a tape connecting said extension and a stationary support, whereby the counterpoise will be swung upwardly and inwardly toward the fulcrum of the beam by an applied load to the platform.

18. In a weighing scale, the combination of a suitable supporting base having a counterpoise pocket formed in its upper face, a scale-beam pivotally supported upon said base, a load-receiving platform applied to said beam, a depending counterpoise pivotally supported upon one end of the scale-beam and projecting into the counterpoise pocket of the base, an extension carried by said counterpoise and extended beyond the end of the beam, and a tape connecting said extension and a stationary support, whereby the counterpoise will be swung upwardly and inwardly toward the fulcrum of the base, by an applied load to the platform.

19. In a weighing scale, the combination of a suitable supporting base, a scale-beam pivotally supported upon said base, a load-receiving platform applied to said beam, a counterpoise pivotally supported upon one end of the scale-beam, an extension carried by said counterpoise and extended beyond the end of the beam, a tape connecting said extension and a stationary support, whereby the counterpoise will be swung upwardly and inwardly toward the fulcrum of the beam by an applied load to the platform, a hollow standard mounted on the base over the counterpoise end of the scale-beam, an indicator drum journaled in the upper end of said standard, a pinion carried by said drum, and a rack bar arranged within the standard and meshing with the pinion at its upper end and connected with the scale-beam at its lower end.

20. In a weighing scale, the combination of a suitable supporting base having a counterpoise pocket formed in its upper face, a scale pivotally supported upon said base, a load-receiving platform applied to said beam, a depending counterpoise pivotally supported upon one end of the scale-beam and projecting into the counterpoise pocket of the base, an extension carried by said counterpoise, a tape connecting said extension and a stationary support, whereby the counterpoise will be swung upwardly by an applied load to the platform, a hollow standard mounted in the base over the counterpoise end of the scale-beam, an indicator drum journaled in the upper end of said standard, a pinion carried by said drum, and a rack bar arranged within the standard and meshing with the pinion at its upper end and connected with the scale-beam at its lower end.

21. In a weighing scale, the combination of a suitable supporting base having a counterpoise pocket formed in its upper face, a scale-beam pivotally supported upon said base, a load-receiving platform applied to said beam, a depending counterpoise pivotally supported upon one end of the scale-beam and projecting into the counterpoise pocket of the base, an extension carried by said counterpoise and extended beyond the end of the beam, a tape connecting said extension and a stationary support, whereby the counterpoise will be swung upwardly and inwardly toward the fulcrum of the beam, by an applied load to the platform, a hollow standard mounted in the base over the counterpoise end of the scale-beam, an indicator drum journaled in the upper end of said standard, a pinion carried by said drum, and a rack bar arranged within the standard and meshing with the pinion at its upper end and connected with the scale-beam at its lower end.

22. In a weighing scale, the combination of a suitable supporting base, a scale-beam pivoted thereon, a load-receiving platform applied to said beam, a swinging counterpoise applied to said beam and wholly carried thereby, a restraining means applied to said counterpoise to cause a swinging movement of the counterpoise upwardly and inwardly toward the fulcrum of the scale-beam by reason of the movement of the scale-beam about its pivot under an applied load, indicating means of the rotary type and embodying a pinion, and a rack bar engaging said pinion and connected to the scale-beam.

In witness whereof I have hereunto set my hand and seal at Anderson, Indiana, this twenty-second day of June, A. D. one thousand nine hundred and ten.

FRANK P. DUNN. [L. S.]

Witnesses:
B. D. MANUEL,
WALTER J. SKEHAN.